United States Patent [19]
Bull et al.

[11] Patent Number: 5,666,903
[45] Date of Patent: Sep. 16, 1997

[54] EXAMINATION OF MILKING ANIMALS

[75] Inventors: Christine Roberta Bull; Diane Susan Spencer, both of Flitwick; Toby Trevor Fury Mottram, Chard; Michael John Street, Bedford; Robin Deirdre Tillett, Flitwick, all of England

[73] Assignee: British Technology Group Limited, London, England

[21] Appl. No.: 428,215

[22] PCT Filed: Nov. 22, 1993

[86] PCT No.: PCT/GB93/02397

§ 371 Date: May 19, 1995

§ 102(e) Date: May 19, 1995

[87] PCT Pub. No.: WO94/12020

PCT Pub. Date: Jun. 9, 1994

[30] Foreign Application Priority Data

Nov. 20, 1992 [GB] United Kingdom ............... 9224406

[51] Int. Cl.⁶ .................. A01J 7/00; A01K 29/00
[52] U.S. Cl. .................. 119/14.01; 119/14.08
[58] Field of Search .............. 119/14.01, 14.02, 119/14.08, 14.14, 174

[56] References Cited

U.S. PATENT DOCUMENTS 4,414,566  11/1983  Peyton et al. ............... 358/101
4,908,871  3/1990   Hara et al. ................... 382/8

FOREIGN PATENT DOCUMENTS

| 0 142 990 | 5/1985 | European Pat. Off. . | |
|---|---|---|---|
| 0 172 663 | 2/1986 | European Pat. Off. . | |
| 8503580 | 7/1987 | Netherlands | 119/14.08 |
| 8602699 | 5/1988 | Netherlands | 119/14.08 |
| 2 105 030 | 3/1983 | United Kingdom . | |
| 2 133 873 | 8/1984 | United Kingdom . | |
| 2 221 032 | 6/1989 | United Kingdom . | |
| 9219098 | 11/1992 | WIPO | 119/14.08 |

OTHER PUBLICATIONS

A1, 1720 602 (Voron Agricultural Institute) 23 Mar. 1992 & Soviet Patent Abstract, P1 Section, week 9307 Apr. 07, 1993 Derwent Publications Ltd. London SU–1720 602.

*Primary Examiner*—Robert P. Swiatek
*Attorney, Agent, or Firm*—Cushman, Darby & Cushman IP Group of Pillsbury Madison & Sutro LLP

[57] ABSTRACT

A method of examining a milking animal presenting for milking including examining the animal with an optical (as herein defined) sensing device responsive to at least one characteristic significant in the acceptability of an animal for milking, assessing the response of the sensing device to determine the acceptability of the animal and controlling the continuance of the presentation of the animal in dependence on the determination.

24 Claims, 2 Drawing Sheets

EXAMINATION OF MILKING ANIMALS

This invention relates to the examination of a milk animal for cleanliness.

When milk is taken from a milk animal using a milking machine, that is by teat cups operated by vacuum pulsation and connected to a milk receiver, it is important to ensure that unwanted material from off the teats or udder does not enter the milk taken into the receiver.

Conventionally an operator looks at the teats and udder of the animal to check for dirt and cleans them if dirt is seen. It is also usual to check the teats and udder for injury. While washing the teats and udder before every milking appears to be an appropriate procedure there is evidence that a selective approach would be better, avoiding excessive washing and the possible spread of pathogens. Such an approach requires an effective examination technique which can be operated automatically.

It is an object of the invention to provides techniques which check for dirt, injury and other unwanted conditions. References herein to optics, light and image and the like are not limited to visible light, the term light including the range of infra red, visible, ultra violet and similarly effective wavelengths.

According to the invention there is provided a method of examining a milking animal presenting for milking including examining the animal with an optical (as herein defined) sensing device responsive to at least one characteristic significant in the acceptability of an animal for milking, assessing the response of the sensing device to determine the acceptability of the animal and controlling the continuation of the presentation of the animal in dependence on said determination.

According to one aspect of the invention there is provided a method of examining a milking animal presenting for milking including preparing an image reference record of an animal, subsequently preparing a further image record of an animal at a presentation for milking, comparing the reference and further image records, determining differences from said comparison and deciding from any said differences whether the animal presenting for milking is to be milked at this presentation.

The further record may be of the same animal as that from which the reference record was prepared. The reference record may be prepared directly from an animal. The reference record may be prepared to be typical of an animal presenting for milking.

According to another aspect of the invention there is provided a method of examining milking animal presenting for milking including providing an optical sensor specific to at least one material associated with an animal condition unacceptable when an animal presents for milking, operating said sensor upon presentation of an animal for milking, detecting the sensor output, assessing the output for the presence of an unacceptable material and controlling the continuation of the presentation of the animal in dependence on said assessment.

The assessment may include the step of deciding whether the indicated presence of a material associated with an unacceptable condition is sufficient to cause the ending of the presentation.

According to a further aspect of the invention there is provided a method of examining a milking animal presenting for milking including providing a reference record of spectral characteristics of a clean teat, capturing the spectral characteristics of each teat of an animal presenting for milking, comparing the recorded and captured characteristics and applying the result of said comparison to control the continuation of the presentation of the animal.

The spectral characteristics may be taken directly from a teat or indirectly from an image of a teat.

The spectral reference record may be a generalised record or a record for the specific animal presenting for milking.

The material may be chlorophyll on at least one of a teat and udder of the animal. The sensor may be sensitive to the absorption wavelength of chlorophyll and directed to the area of the teats and udder of the animal.

The sensor may be receptive to the fluorescence of chlorophyll or other material, and the method may include supplying a radiation capable of causing said fluorescence, the radiation being supplied at least to the area of the teats and udder to which area the sensor is also directed.

The sensor may be receptive to the absorption by chlorophyll or other material of specific radiation wavelengths, preferably in the range of wavelengths including the infra red, visible and ultra violet wavelengths.

The sensor may be receptive to the increased absorption by the teat and any material thereon of specific radiation wavelengths, preferably in the ranges of wavelengths including 670 to 690, 530 to 575 nanometers and a normalised wavelength in the near infra red.

If following the comparison the decision is that the presenting animal is not to be milked without further action the animal may be cleaned as required or directed elsewhere for cleaning, examination or other action.

According to the invention there is provided an apparatus for the examination of a milking animal presenting for milking including an optical (as herein defined) sensing device responsive to at least one characteristic significant in the acceptability of an animal for milking and effective in operation to provide an output in dependence on such response, means to support at least the device in the vicinity of the animal and in sensing range thereof, means responsive to said output to assess the response of the sensing device, determine the acceptability of the animal for presentation for milking and indicate said determination.

The apparatus may include means responsive to said indication to control the continuation of the presentation of the animal. The indication may be a visual, audible or like indication for an operative.

Embodiments of the invention will now be described with reference to the accompanying drawings in which:

FIG. 1 shows apparatus for a milking animal examination method according to the invention, and FIGS. 2 and 3 show graphs useful in understanding the invention.

FIG. 1 shows a milking animal, in this example a cow, MA, standing in a stall having a floor F and guide members G1 and G2. The stall may have a step ST so that the animal adopts an attitude convenient to the animal which also improves the visibility of the udder and teats. Conventional means to control the access and egress of the animal are represented by hinged movable bars B1, B2, suitable controls (not shown) being provided for these. No exact form of stall is given as the details of suitable forms are well-known in the art and will only be referred to when relevant to the present invention.

The equipment for an examination method according to the invention includes cameras or like imaging devices C1 and C2. These are connected to a control unit CU. A light source or sources exemplified by unit LS are also connected to the control unit CU. The source or sources may provide structured light, e.g. a grid or dots. The control unit has a connection for a power source PS, such as the alternating current mains. (Suitable protection against electric shock in case of fault or damage must be provided in any suitable manner.) The control unit has an indicator IN to indicate the result of the examination shown by way of example in a simple form as pass (a tick) or fail (a cross), although clearly any suitable indication including more than one aspect of the examination and a degree of attainment of a required pass level is possible. A signal/control connection INS is provided for connection to associated control equipment, such as an automatic milking system, to control the access of the animal and the egress to an, or possibly alternative, exit(s). Such systems are now well-known in the art, for example UK PS 2226941, which is incorporated herein by reference.

The light source LS and imaging devices C1 and C2 are arranged to respectively illuminate the teats and udder of an animal in the stall and receive images of these. The light may be adapted to assist in revealing shape, texture or other aspects of the illuminated region. Conveniently the imaging devices are forward of, to each side of and below the level of the teats and udder to give a clear view. Images from the devices C1 and C2 are collected and compared in control unit CU by suitable signal processing means readily devised by those skilled in the art.

The devices C1 and C2 may take still or moving images and are conveniently of the video type.

In operation of the apparatus for one method of the invention a specific animal is placed in the stall. A reference image of the illuminated teats and udder is formed by the imaging devices and collected and stored in the control unit or elsewhere as appropriate to the specific animal. The reference image shows the teats and udder in a state suitably clean and ready for milking. To this end the reference image needs to record details such as colour and pattern so that dirt, injury or other unwanted condition can be detected if present at a subsequent examination.

The reference image identified with the animal is stored for recovery when required.

At a subsequent presentation of an animal the animal identified and the appropriate reference image recovered. A further image is then formed of the presenting animal and compared with the reference image. Either the animal should be in approximately the same position so that the images are similar in general form to permit ready comparison or appropriate image handling techniques applied to take account of a different position. The result of the comparison is indicated at IN in any convenient manner, as mentioned above.

In dependence on the result of the comparison the animal can proceed to be milked, have the dirty teats cleaned and then proceed to be milked or directed to an area where further checks can be made, for example by an attendant.

The image can be of various forms. If signal processing capacity is sufficient full-colour real-time images can be used and compared. However to reduce signal processing demands, simplified images can be used. In particular, a generalised reference image may be used. In many animals the teats and sometimes the udder have a colour pattern. This colour pattern image can be reduced to numerical information about the image, for example a ratio of the areas of the colour pattern without information on the actual shapes of the pattern. If dirt or other changes occur, the ratio of the reference image will not be repeated at a further image and the presence of dirt etc. will be found on comparison of the ratios and provide the required indication.

It will be noted that two imaging devices at different angles to the animal are shown. Additional imaging devices may be used or the animal can be in a different position to improve image capture. This permits the reference and further images to be "three-dimensional" in nature. This term is not intended to relate only to a fully three-dimensional image but to one in which the different angles of view permit the greater part of the teats and udder to be examined without one teat obscuring another teat. Also the finding of a required object, such as a teat, against the background, such as the stall or building, can be aided by such techniques.

Another form of image analysis can be the use of a "template" which is recorded and compared by a suitable technique, for example overlay, with a subsequent image template. The exact degree of match depends on the accuracy required. The template can be flexible", that is adjustable in response to known variability in the form of teats and the udder. As before, discrepancies indicate the possible presence of contaminants or teat damage.

Clearly automatic techniques of image analysis can be applied and a robotic device is appropriate.

Reference has been made above to full-colour images. References herein to, light and colour are not to be limited to visible light, but include the range of infra red, visible and ultra violet wavelengths. Selected wavelengths in this range can be used. These need not be a complete spectrum but selected wavelengths only may be used. Dirt and the like, as above, will alter the spectrum or spectral characteristics.

A further technique in accordance with the invention uses a light source, or an additional light source, such as those outlined above which will cause specific expected unwanted material on the udder or teats to fluoresce or absorb light so that the further image will include a fluorescent effect or increased absorption of light.

Specifically at wavelengths in the region of 670 nanometers there is substantial absorption by chlorophyll and chlorophyll is generally present in dirt associated with milking animals, such as manure.

Miniature devices now available, such as single chip cameras, permit the examination to be carried out by equipment which examines the whole surface of an individual teat by encircling it, for example by being spun around the teat, or by entering among the teats.

The examination may be carried out before an animal enters a milking stall or when it is in the stall. The examination apparatus may be carried by a robot which may be a robot for a milking apparatus. A laser stripe technique such as those known in the imaging art may be used to assist in determining the location of a teat to be examined.

The cycle of operation for examination and cleaning of the teats should generally be short. Based on the expected behaviour of an animal presenting for milking the entry of an animal into a stall, whether the milking stall or a preliminary stall, may start the milk section reflex which thus sets a time of some 120 seconds for the completion of examination and cleaning. This gives no more than 25 seconds for each teat, assuming one device moving to each teat in turn. A saving in time at the cost of increased complexity might be achieved with two devices. However such time constraints may not always apply, particularly if a contact-free examination, such as the remote-sensing image comparison described above, is employed.

To examine the teat a technique of determining the response to illumination is used. Specifically reflectance measurements from a teat are made through a monochromator in the range 300 to 1100 nanometers, although other ranges may be used. The time for one scan over the range is some 80 milliseconds and to improve the signal to noise ratio 50 scans are made and averaged in some 4 seconds.

The illumination is based on a tungsten halogen lamp, with light transmission through a bifurcated glass fibre light guide some 0.5 meter in length to and from the sensor which will generally need to be close to the teat. The light guide path from the teat is applied to the monochromator and spectrum analyser (Monolight Instruments type OSA6100).

From measurements of reflectance from teats Known to be clean and others known to be contaminated and by comparison with a standard reflecting surface (Spectralon SRS-99-020, Oriel Scientific Ltd), the effect of contamination and distance from a teat can be assessed.

Figure 1:
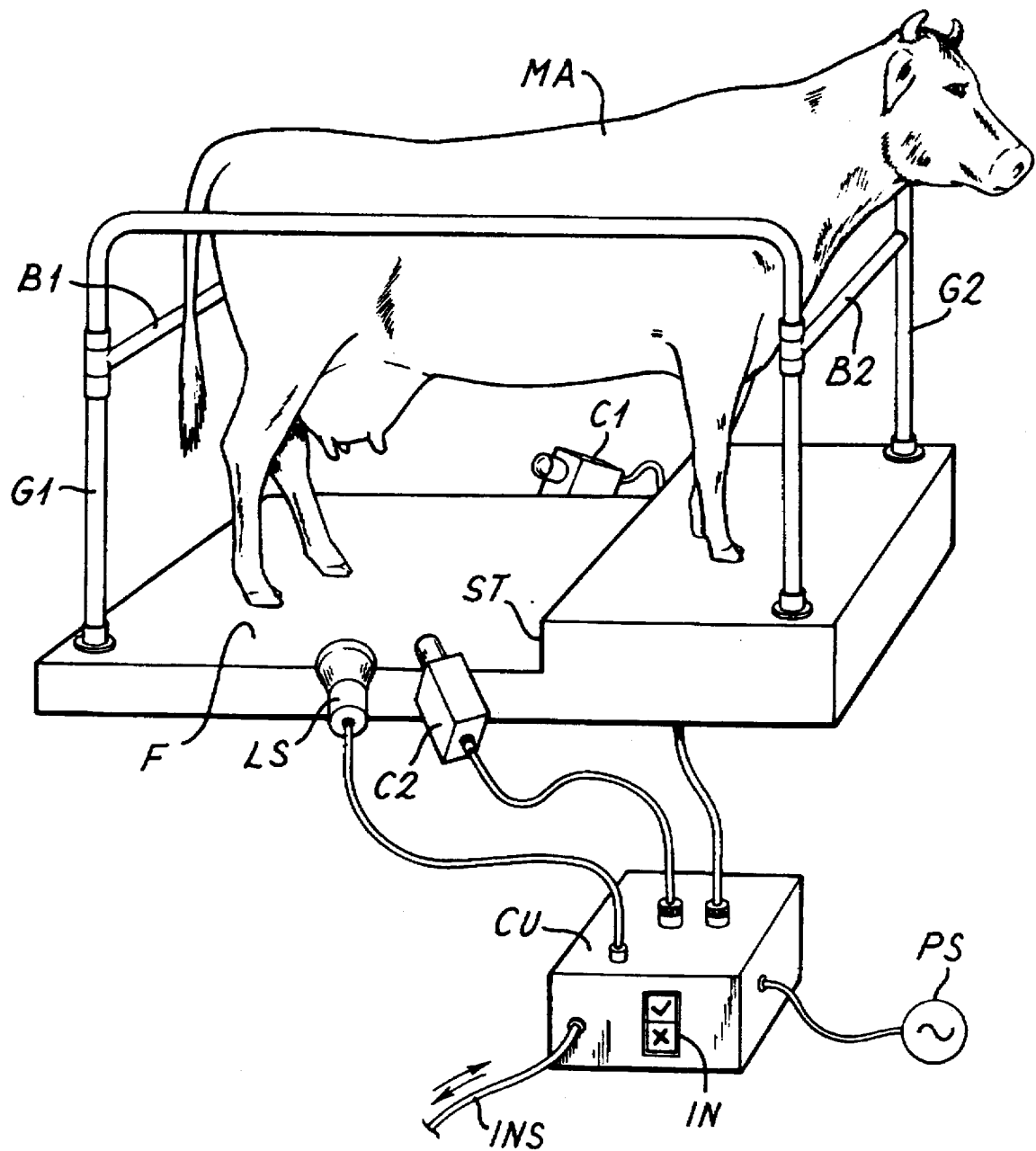
Figure 2:
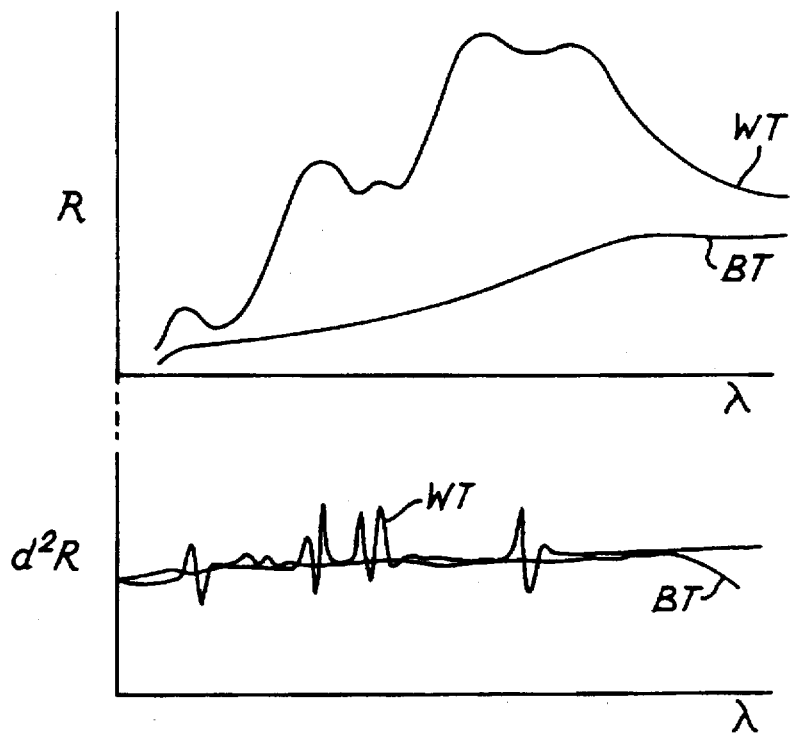
FIG. 2 shows the reflectance (R) and second derivative of reflectance ($d^2R$) for a white teat (WT) and a black teat (BT). The white teat has a number of prominent spectral feature while the black teat is relatively featureless, as indicated also by the second derivative being almost flat throughout the range of examination.
Figure 3:
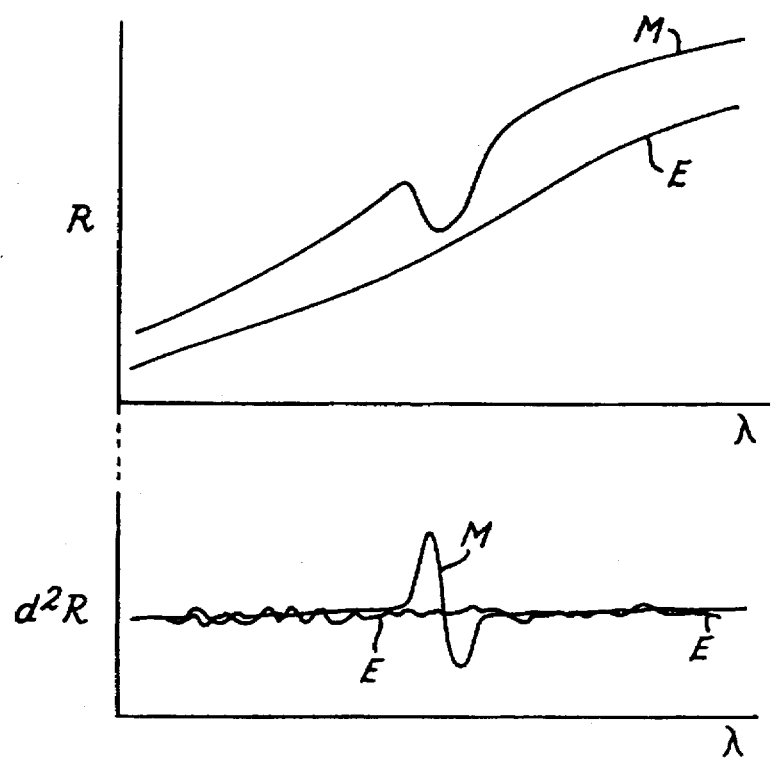
FIG. 3 shows the reflectance of earth (E) and manure (M). Manure has a distinct characteristic with strong absorbance at about 670 nanometers, the chlorophyll absorption band.

The characteristic for earth (E) is without significant features and the second derivative is almost flat, similar to the one for the black teat. However there is somewhat higher reflectance for earth in the near infra red. The distance between the end of the light guide and the teat can affect the measured reflectance, not merely reducing the size of the signal, so some control of distance during measurements may be needed.

The reflectance of clean teats and contaminated teats, at least for earth and manure contamination, thus have specific distinct characteristics which permit the detection of contamination in certain situations. In particular, by using certain wavelengths and comparing the reflectance at each wavelength the required examination can be made. It has been found that the bands 670 to 690 and 530 to 575 nanometers and a normalised wavelength in the near infra red together permit the identification of contamination by manure or earth on white or black teats. By using filters appropriate to these wavelengths a compact sensing arrangement is possible. Clearly the invention is not limited to these bands or wavelengths.

The examination techniques set out above can be applied directly to the teat or other area of interest or can be applied to an image if this is of sufficient resolution and sensitivity to permit examination at a remote position. Furthermore if the position of a teat or other area of interest can be determined, for example by a laser stripe pattern matching, examination is possible without having a detailed image of the teat or other area.

The methods and apparatus described above provide techniques for checking milking animals for dirt, injury and other unwanted conditions and indicating whether or not an animal presenting for milking is to be milked.

We claim:

1. A method of examining a milking animal presenting for milking including the steps of:
   preparing an image reference record of said animal;
   examining said animal with an optical sensing device responsive to light in at least one of the ranges of infra red, visible, and ultraviolet, and also responsive to at least one characteristic significant in the acceptability of said animal for milking;
   preparing a further image record of said animal based on said examining step;
   assessing the response of said sensing device to determine the acceptability of said animal, including:
   comparing said image reference record and said further image record,
   determining differences from said the comparison step and deciding whether said animal is to be milked at said the
   presentation based on said differences; and
   controlling the continuance of said presentation of said animal in dependence on said determining step.

2. A method according to claim 1, wherein said steps of preparing said further image record and preparing said image reference record are performed using the same animal.

3. A method according to claim 1, wherein said step of preparing said image reference record is performed directly from an animal.

4. A method according to claim 1, wherein said step of preparing said image reference record is performed so that it is typical of an animal presenting for milking.

5. A method according to claim 1 wherein said optical sensing device is specific to a material associated with an animal condition unacceptable when said animal presents for milking.

6. A method according to claim 5 wherein said optical sensing device is specific to chlorophyll on at least one of a teat and udder of an animal.

7. A method according to claim 6 wherein said optical sensing device is sensitive to the absorption wavelength of chlorophyll, said method further including directing said optical sensing device to an area of the teats and udder of said animal.

8. A method according to claim 5, further including:
   supplying a radiation capable of causing fluorescence of a material;
   applying said radiation at least to an area of the teats and udder of said animal; and
   directing said optical sensing device to said area.

9. A method according to claim 1, further including the step of deciding whether said determining step indicates an unacceptable condition sufficient to cause the ending of said presentation.

10. A method according to claim 1 further including the steps of:
    providing a reference record of spectral characteristics of a clean teat;
    capturing spectral characteristics of each teat of said animal presenting for milking;
    comparing said reference record and captured characteristics and applying the result of the said comparison to control the continuation of said presentation of said animal.

11. A method according to claim 10, wherein said step of providing said reference record includes preparing a generalised spectral reference record.

12. A method according to claim 10, wherein said step of providing said reference record includes preparing a spectral reference record specific to an animal to be examined.

13. A method according to claim 1, wherein said at least one characteristic is a variation of reflectance with wavelength.

14. A method according to claim 1, wherein said at least one characteristic is a derivative of a variation of reflectance with wavelength.

15. A method according to claim 1, wherein said at least one characteristic is the second derivative of a variation of reflectance with wavelength.

16. A method according to claim 1, wherein said optical sensing device is effective in at least the ranges of wavelengths 670 to 690, 530 to 575 nanometers and a normalised wavelength in the near infra red.

17. A method as claimed in claim 1 wherein said image reference and further image records are in the form of numerical information.

18. A method as claimed in claim 1 wherein said image reference and further image records are in the form of ratios of areas of colour.

19. Apparatus for the examination of a milking animal presenting for milking comprising:

an optical sensing device responsive to light in at least one of the ranges of infra red, visible, and ultraviolet light, and also responsive to at least one characteristic significant in the acceptability of said animal for milking, said optical sensing device being effective in operation to provide an output in dependence on such response;

means to support at least said optical sensing device in the vicinity of said animal and within a sensing range thereof; and means responsive to said output to assess the response of said optical sensing device, including:

means for comparing and determining differences between said output and an image record of said animal based on said at least one characteristic; and means for determining the acceptability of said animal for presentation for milking and for providing an indication of said determination.

20. Apparatus according to claim 19, further including means responsive to said indication to control the continuation of said presentation of said animal.

21. Apparatus according to claim 19, wherein said indication is at least one of a visual, audible and like indication for an operative.

22. Apparatus according to claim 19, wherein said apparatus is arranged for automatic operation and wherein said indication is a signal to which said automatic apparatus is responsive.

23. An apparatus as claimed in claim 19 wherein said output and said image record are in the form of numerical information.

24. An apparatus as claimed in claim 19 wherein said output and said image record are in the form of ratios of areas of colour.

* * * * *